US006581828B1

(12) United States Patent
Forsythe et al.

(10) Patent No.: US 6,581,828 B1
(45) Date of Patent: Jun. 24, 2003

(54) ELECTRONIC PRICE LABEL AND ASSEMBLY METHOD

(75) Inventors: Donald L. Forsythe, Dacula, GA (US); Horng-Jaan Lin, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/501,931

(22) Filed: Feb. 10, 2000

(51) Int. Cl.[7] ................................................ G06K 15/00
(52) U.S. Cl. ........................ 235/383; 235/492; 235/375
(58) Field of Search ................................ 235/487, 492, 235/375, 383

(56) References Cited

U.S. PATENT DOCUMENTS 5,847,378 A * 12/1998 Goodwin, III .............. 235/383
6,147,604 A * 11/2000 Wiklof et al. ............... 235/487
6,217,966 B1 * 4/2001 Finster et al. .............. 428/42.1
6,243,690 B1 * 6/2001 Adamec et al. ............. 235/383
6,288,905 B1 * 9/2001 Chung ......................... 361/771
6,404,643 B1 * 6/2002 Chung ......................... 361/737

FOREIGN PATENT DOCUMENTS

JP 411219112 A * 8/1999

* cited by examiner

*Primary Examiner*—Thien M. Le
*Assistant Examiner*—Allyson Sanders
(74) *Attorney, Agent, or Firm*—Paul W. Martin

(57) ABSTRACT

An electronic price label (EPLs) and assembly method which allow multiple such EPLs to be produced together. The EPL includes a container, electronic circuitry, including a display, in the container, and a transparent lid over the container to expose the display. The assembly method involves aligning a plurality of containers, inserting electronic circuitry, including a display, in each container, and applying a lid having a transparent area for exposing the display to the containers. Following assembly, the EPLs are separated.

13 Claims, 10 Drawing Sheets

ELECTRONIC PRICE LABEL AND ASSEMBLY METHOD

BACKGROUND OF THE INVENTION

The present invention relates to electronic price label (EPL) systems, and more specifically to an electronic price label and assembly method.

EPL systems typically include a plurality of EPLs for merchandise items in a transaction establishment. EPLs typically display the prices of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs must be low in price. Previous EPL designs include plastic housings which are assembled after internal electronic components have been added. Such designs require that each EPL be assembled individually. Following assembly, printed overlays must also be applied an individual basis.

Therefore, it would be desirable to provide a new EPL design which allows a plurality of EPLs to be assembled simultaneously. It would also be desirable to provide such a design to facilitate simultaneous application of printed overlays as part of the assembly process.

SUMMARY OF THE INVENTION

In accordance with the teachings of the present invention, an electronic price label (EPL) and assembly method are provided.

The EPL includes a container, electronic circuitry, including a display, in the container, and a transparent lid over the container to expose the display.

The assembly method involves aligning a plurality of containers, inserting electronic circuitry, including a display, in each container, and applying a lid having a transparent area for exposing the display to the containers. Following assembly, the EPLs are separated.

It is accordingly an object of the present invention to provide an EPL and EPL assembly method.

It is another object of the present invention to provide an EPL and EPL assembly method which facilitate simultaneous assembly of a plurality of EPLs.

It is another object of the present invention to provide an EPL and EPL assembly method which facilitate simultaneous assembly of a plurality of EPLs followed by simultaneous application of printed overlays.

It is another object of the present invention to provide an EPL and EPL assembly method which reduce cost of manufacture of EPLs.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
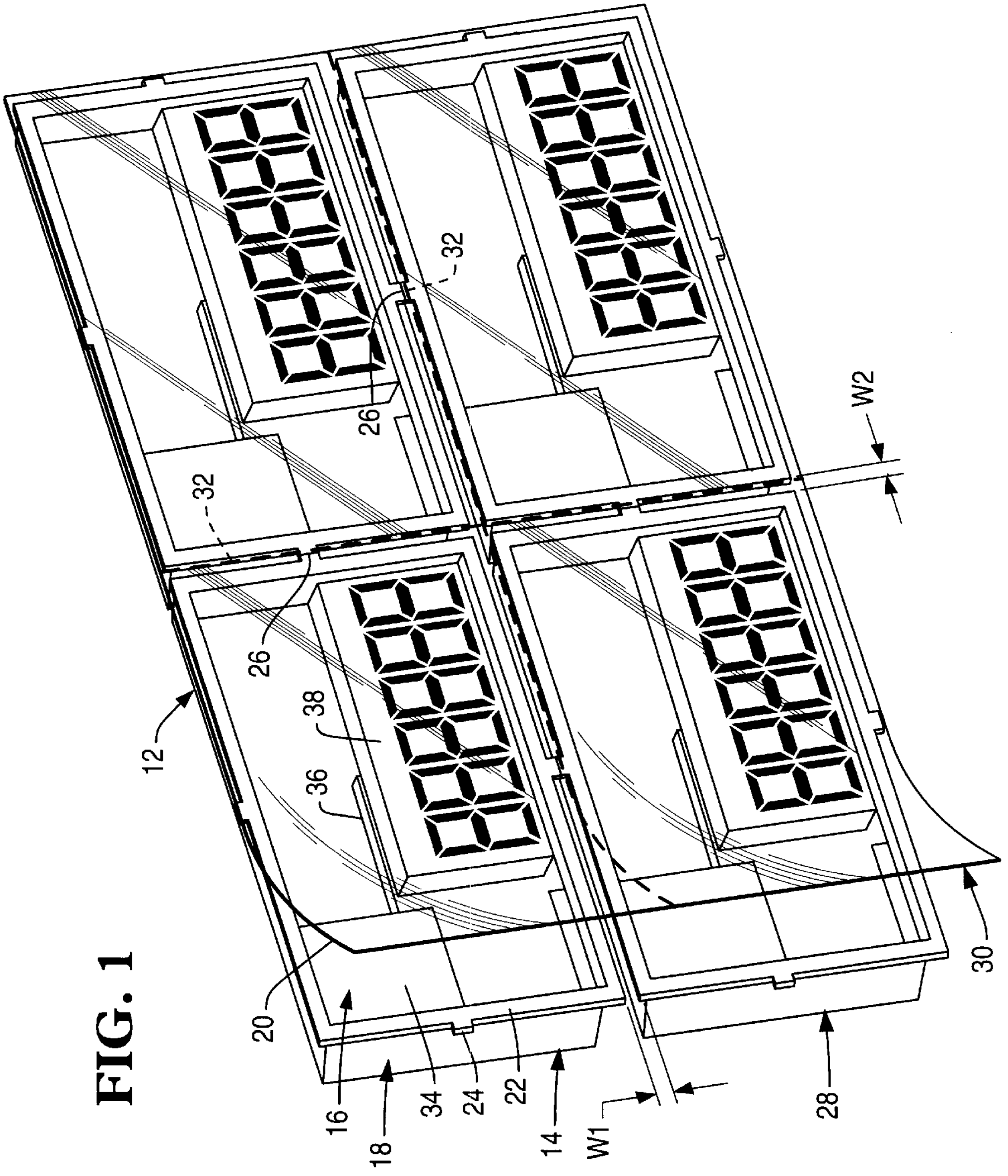
FIG. 1 is a perspective view of a plurality of electronic price labels (EPLs) arranged in a first EPL sheet.

Referring to FIG. 1, an EPL sheet 10 of electronic price labels (EPLs) 12 is illustrated. EPL sheet 10 includes rows and columns of connected EPLs 12. The rows are separated by distance W1 and the columns are separated by distance W2. Distance W1 may vary with the type of EPL 12 being produced.

EPLs 12 include housing 14 and internal components 16.

Housing 14 includes tub portion 18 and a lid portion 20.

Tub portion 18 is generally box-shaped, including four sides and a bottom, but other shapes are also envisioned. Tub portion 18 contains internal components 16. Tub portion 18 may be made of plastic, polystyrene film or equivalent. A film thickness of about 0.025" is suitable.

Tub portion 18 includes lip 22 to which lid portion 20 attaches. Lip 22 includes joining strip 24 which joins one tub portion 18 to another tub portion 18 to form a fan-fold or tub sheet 28 of tub portions 18. Joining strips 24 include score lines 26 which are added during manufacture to make tub portions 18 more easily separable for installation in a store. Horizontal and vertical score lines 26 are shown. Tub portions 18 are separated from each either by distances W1 and W2, which are substantially equal.

Information about individual EPLs 12, such as serial numbers and manufacture dates, may be printed or applied as labels on tub sheet 28, preferably on a bottom outside surface 19 of tub portions 18.

Lid portion 20 covers tub portion 18. Lid portion 20 may be made of transparent plastic, polycarbonate or polyester film or equivalent. A film thickness of about 0.020" is suitable.

Lid portion 20 is preferably applied as part of a lid sheet or laminate 30 of lid portions 20. Lid portion 20 may be heat-sealed, ultrasonic welded, or attached through some other mass production method to tub 18 along the lip at the top surface. Individual lid portions 20 may be separated by horizontal and score lines 32, which coincide with score lines 26. Horizontal and vertical score lines 32 are shown.

Store information and information about individual products associated with EPLs 12 that rarely changes may be printed on lid sheet 30 before application to tub sheet 28. Such printing may be in lieu of separate printing and application of overlay sheet 40 (FIG. 2) onto lid sheet 30. The printing method for lid sheet 30 would be accomplished through silk-screen, ink-jet, or other such mass production method similar to imprinting on plastic packages in that industry.

Internal components 16 are responsible for the display functionality of EPLs 10. Internal components 16 primarily include antenna 34, printed circuit board 36, and display 38. Display 38 is preferably located high enough in tub portion 18 so that the face of display 38 contacts lid portion 20.

EPLs 12 are assembled together. First, information about individual EPLs 12, such as serial numbers and manufacture dates, is printed or applied as labels on bottom outside surface 19 of tub portions 18. Next, internal components 16 are inserted into tub portions 18 of tub sheet 28, either individually or together. Lid sheet 30 is applied over tub sheet 28 to form EPL sheet 10. Before application to tub sheet 28, lid sheet 30 may be pre-printed with product and store information that rarely changes. Alternatively, overlay sheet 40 (FIG. 2) may be printed and applied over lid sheet 30. Individual EPLs 12 may be easily separated from EPL sheet 10 during installation in a store.

Figure 2:
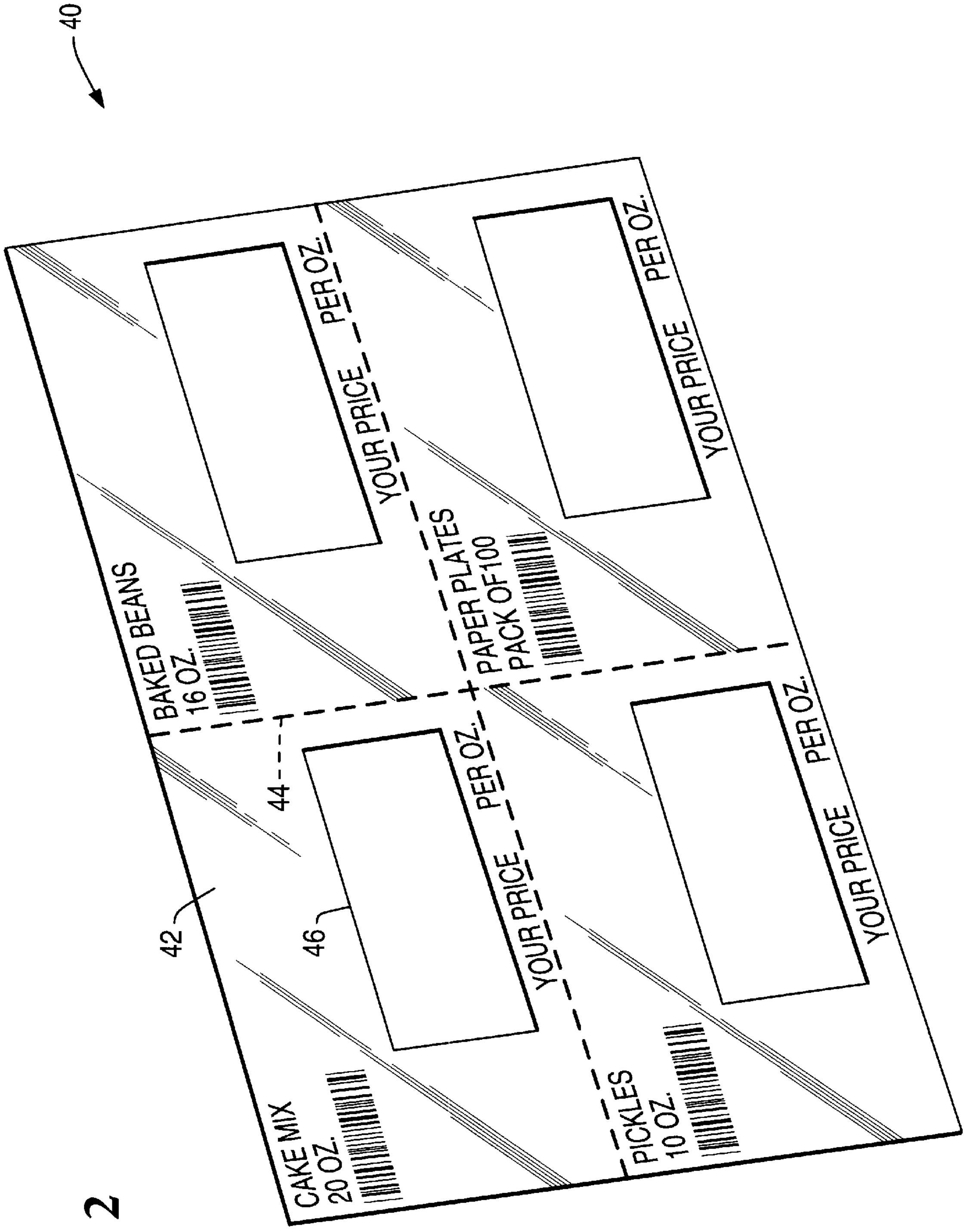
FIG. 2 is a perspective view of overlays arranged in an overlay sheet to be applied to the EPL sheet.

With reference to FIG. 2, an overlay sheet 40 suitable for application to EPL sheet 10 is shown. Overlay sheet 40 includes a plurality of overlays 42. Overlays 42 are printed with product and store information that rarely change. Overlays 42 contain cutout areas 46 which substantially coincide with the frontal areas of displays 38.

Figure 3:
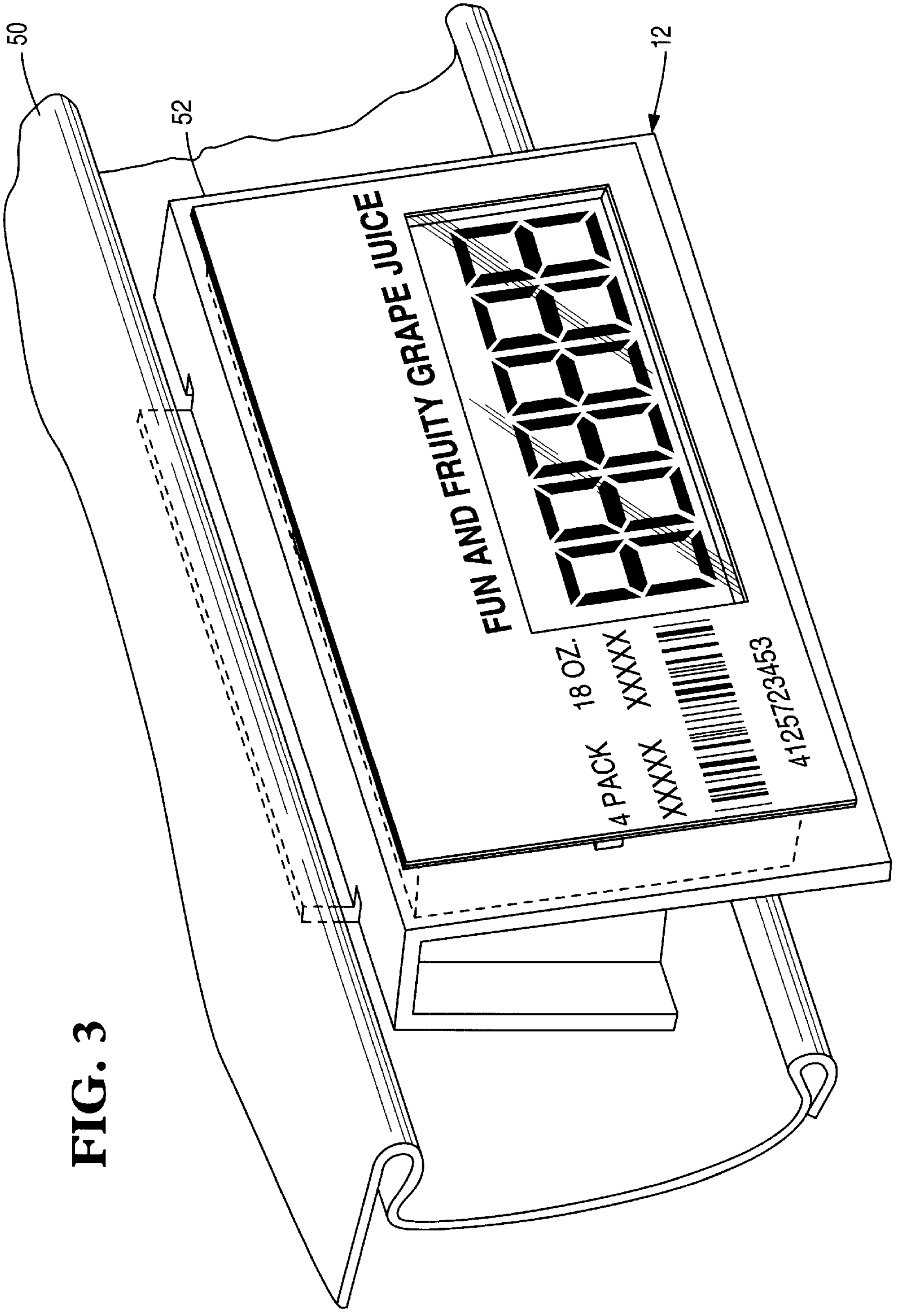
FIG. 3 is a perspective view of the EPL from FIG. 1 conventionally mounted in a shelf channel using hardware.

Turning now to FIG. 3, an assembled and separated EPL 12 from EPL sheet 10 is shown. Since EPL 12 has a conventional box-like shape, it can be easily mounted to shelf channel 50 in a conventional manner using a mounting bracket 52. Shelf channel 50 may be integrally formed within a shelf or separately located within a rail attached to a shelf.

Figure 4:
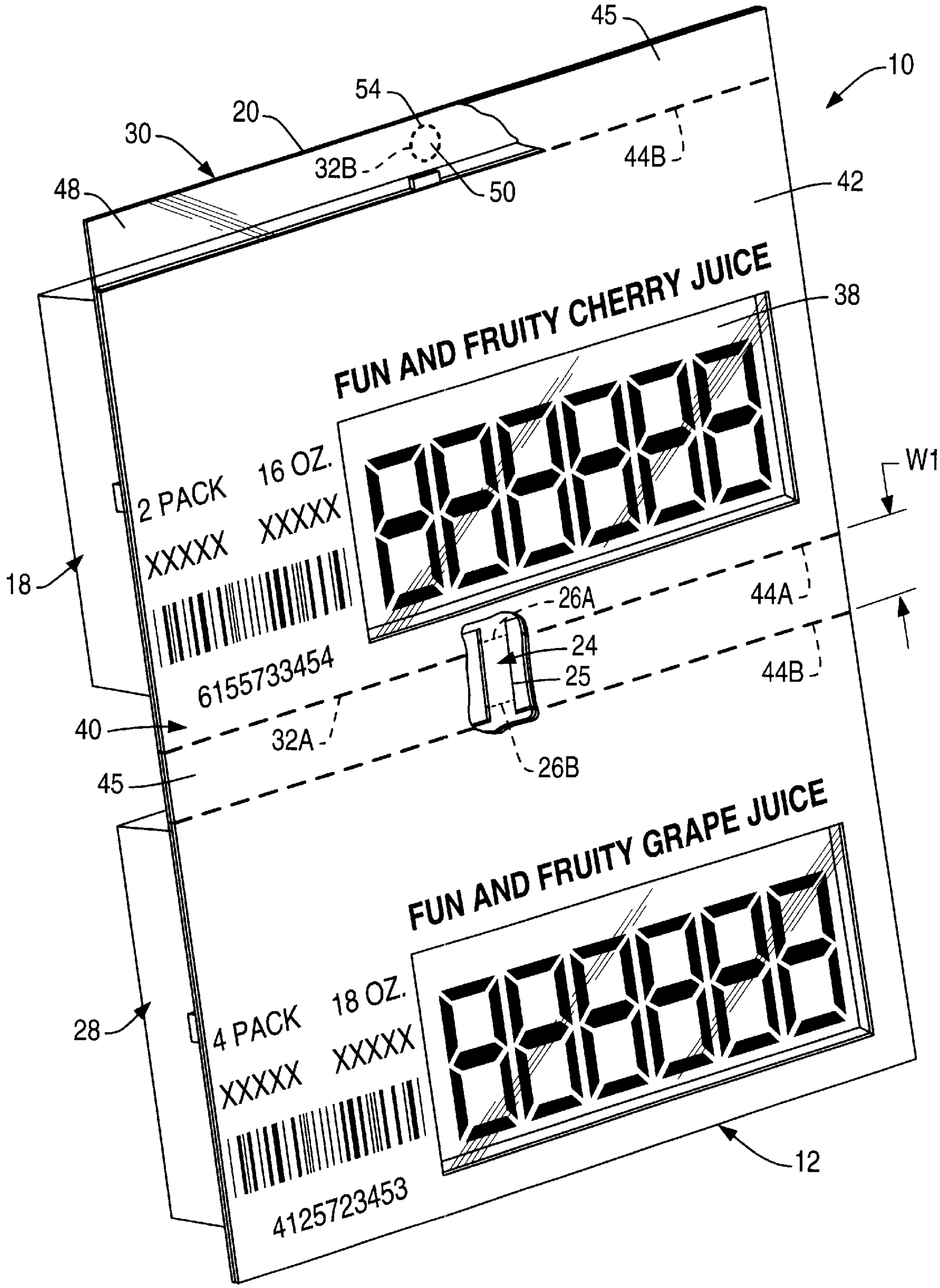
FIG. 4 is a perspective view of a plurality of electronic price labels (EPLs) arranged in a second EPL sheet.
Figure 5:
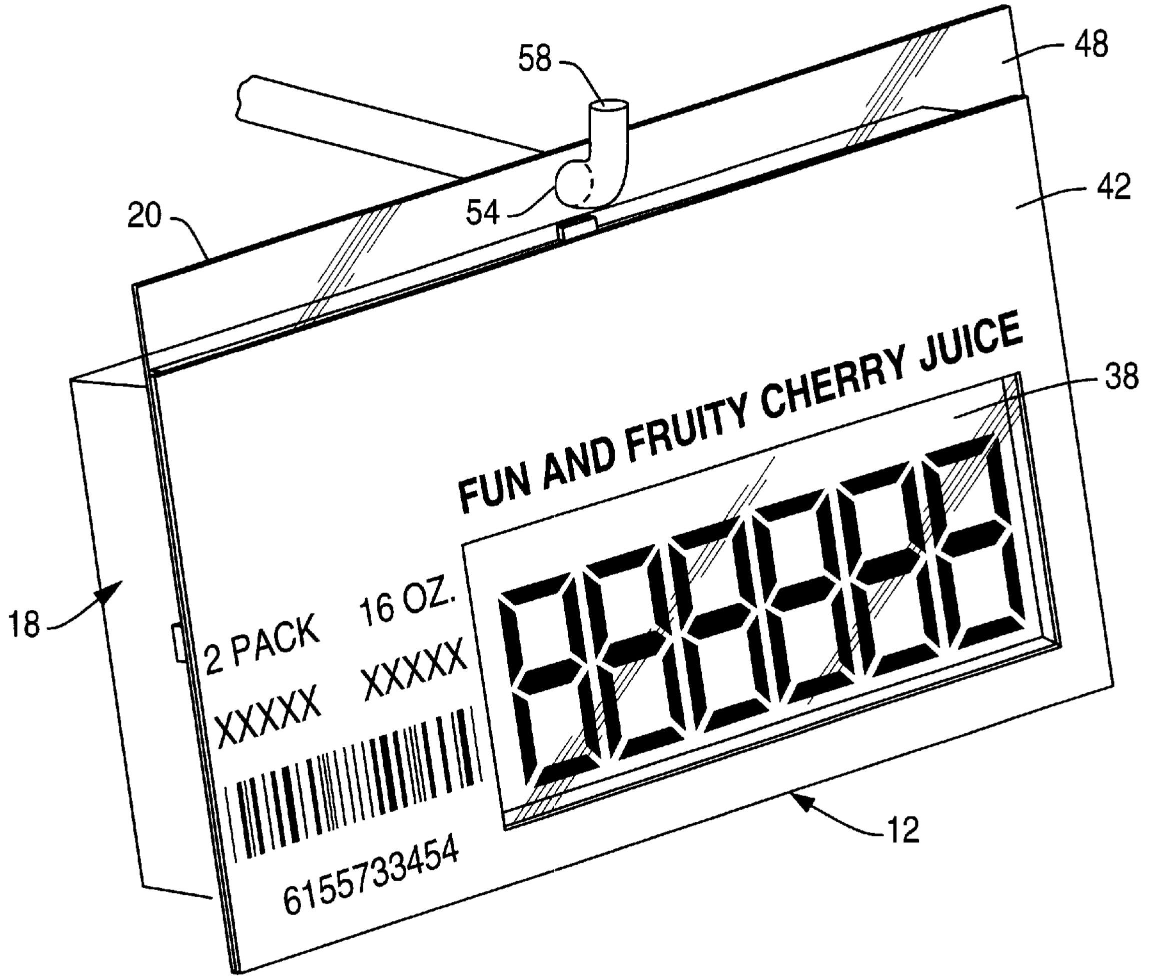
FIG. 5 is a perspective view of the EPL from FIG. 4 mounted on a rod.

Turning now to FIG. 4, an alternative EPL sheet 10 is shown. EPL sheet 10 is manufactured in a similar fashion as the EPL sheet of FIG. 1, except that distance W1 is wider. The wider distance W1 provides a top overlay portion 48 which is used to hang EPLs 12 from a hook or rod 58 through aperture (FIG. 5).

Tub sheet 28 includes longer joining strips 24, which have two horizontal score lines 26A and 26B. Score lines 26A and 26B allow excess material 25 in joining strips 24 to be removed. In particular, score line 26B allows excess material 25 to be removed from adjacent aperture 54 in top overlay portion 48. Vertical score lines 26 along the sides of EPLs 12 are similar to those in FIG. 1.

Lid sheet 30 includes score lines 32A and 32B.

Score line 32A forms a dividing line between EPLs 12 as in FIG. 1. Score line 32B allows material 56 to be removed from aperture 54. Vertical score lines 32 along the sides of EPLs 12 are similar to those in FIG. 1

Overlay sheet 40 includes score lines 44A and 44B which allow excess overlay material 45 to be removed during installation. Vertical score lines 44 along the sides of EPLs 12 are similar to those in FIG. 1.

Turning now to FIG. 5, an assembled and separated EPL 12 from EPL sheet 10 of FIG. 4 is shown. Since EPL 12 has been manufactured to include top overlay portion 48, no additional mounting elements are necessary to mount EPL 12 on rod 58.

Figure 6:
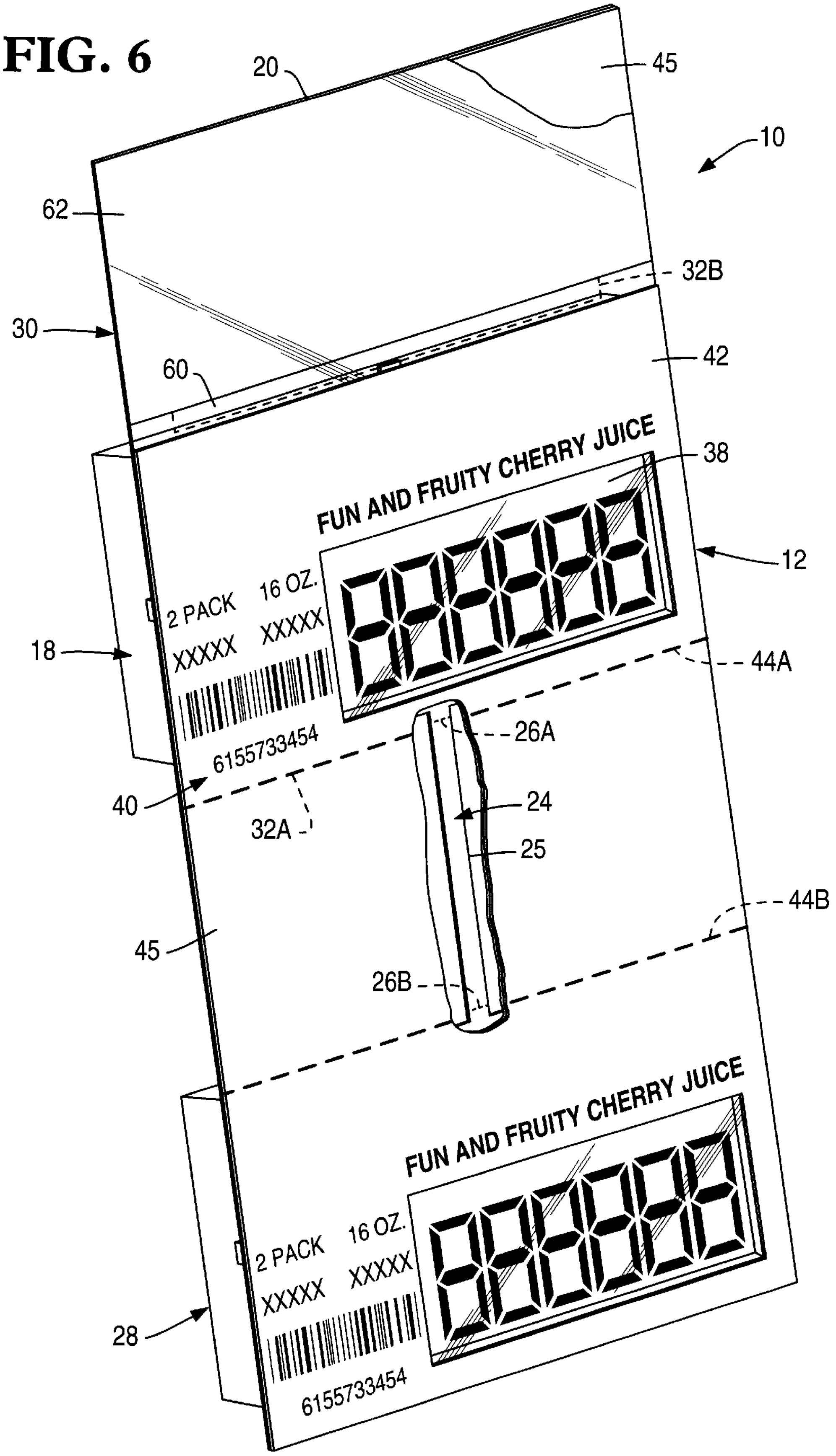
FIG. 6 is a perspective view of a plurality of electronic price labels (EPLs) arranged in a third EPL sheet.
Figure 7:
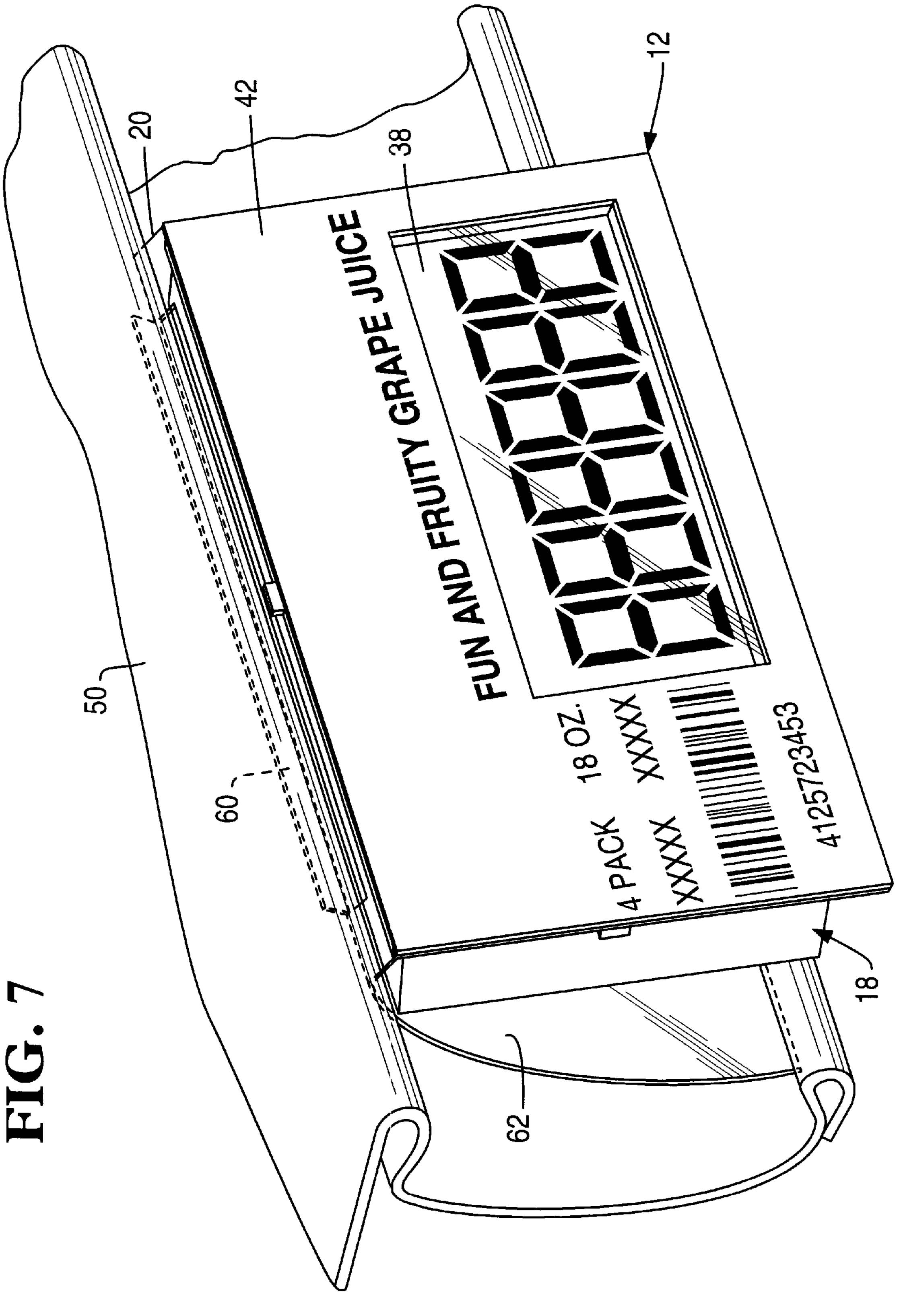
FIG. 7 is a perspective view of the EPL from FIG. 6 mounted in a shelf channel using no additional mounting apparatus.

Turning now to FIG. 6, another alternative EPL sheet 10 is shown. EPL sheet 10 is manufactured in a similar fashion as the EPL sheet of FIG. 4, except that distance W1 is wider yet. The wider distance W1 provides extra material for mounting EPL 12 within shelf channel 50 (FIG. 7).

Tub sheet 28 includes longer joining strips 24, which have two score lines 26A and 26B. Score lines 26A and 26B allow excess material 25 in joining strips 24 to be removed.

Lid sheet 30 includes score lines 32A and 32B. Score line 32A forms a dividing line between EPLs 12 as in FIGS. 1 and 4. Score line 32B delineates top mounting portion 60 for engaging an upper surface within the shelf channel of shelf channel 50. Lid sheet 30 includes enough area to provide a bottom mounting portion 62 for engaging a lower surface within the shelf channel of shelf channel 50.

Overlay sheet 40 includes score lines 44A and 44B which allow excess overlay material 45 to be removed during installation. Vertical score lines 44 along the sides of EPLs 12 are similar to those in FIG. 1.

Figure 8:
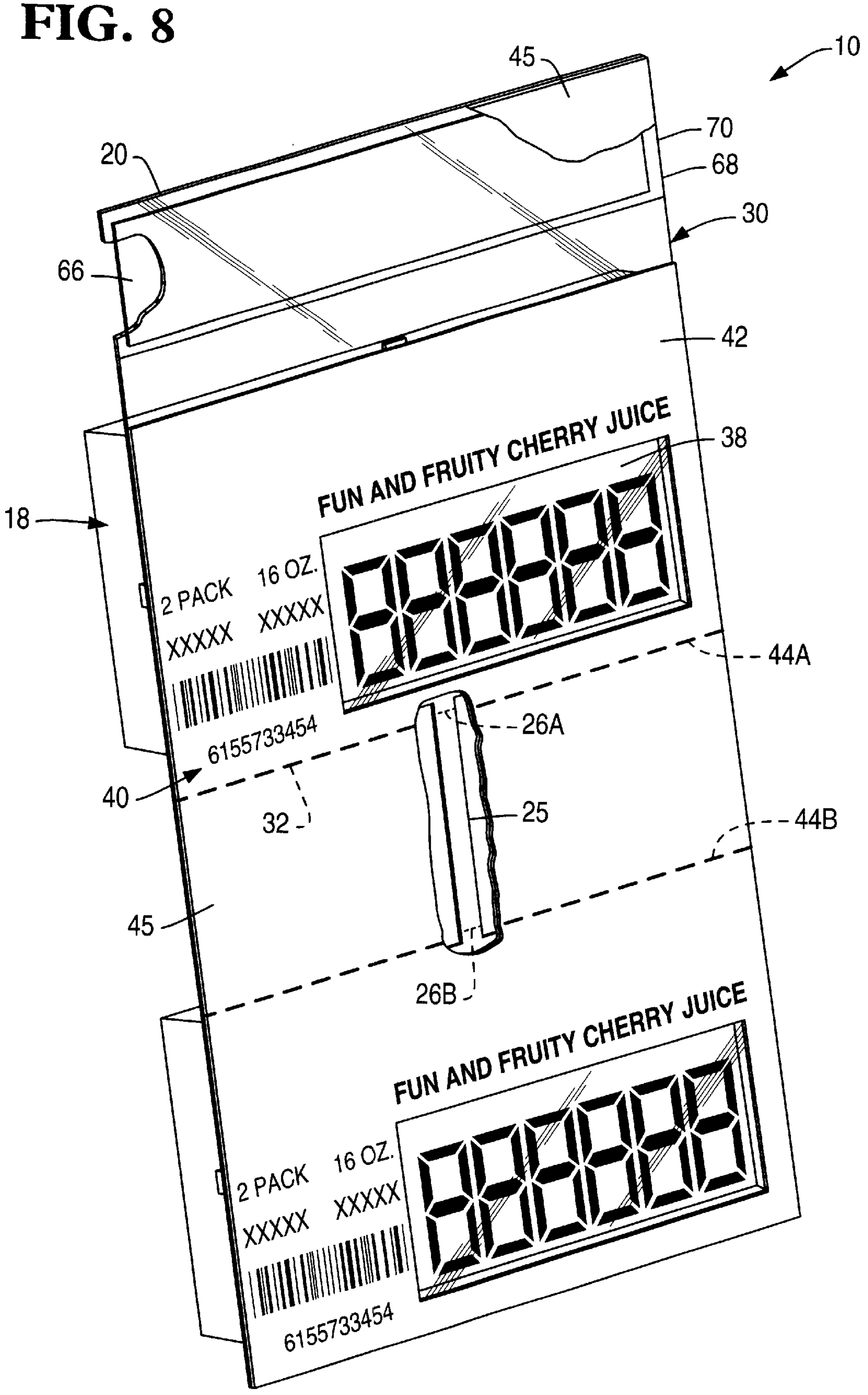
FIG. 8 is a perspective view of a plurality of electronic price labels (EPLs) arranged in a fourth EPL sheet.
Figure 9:
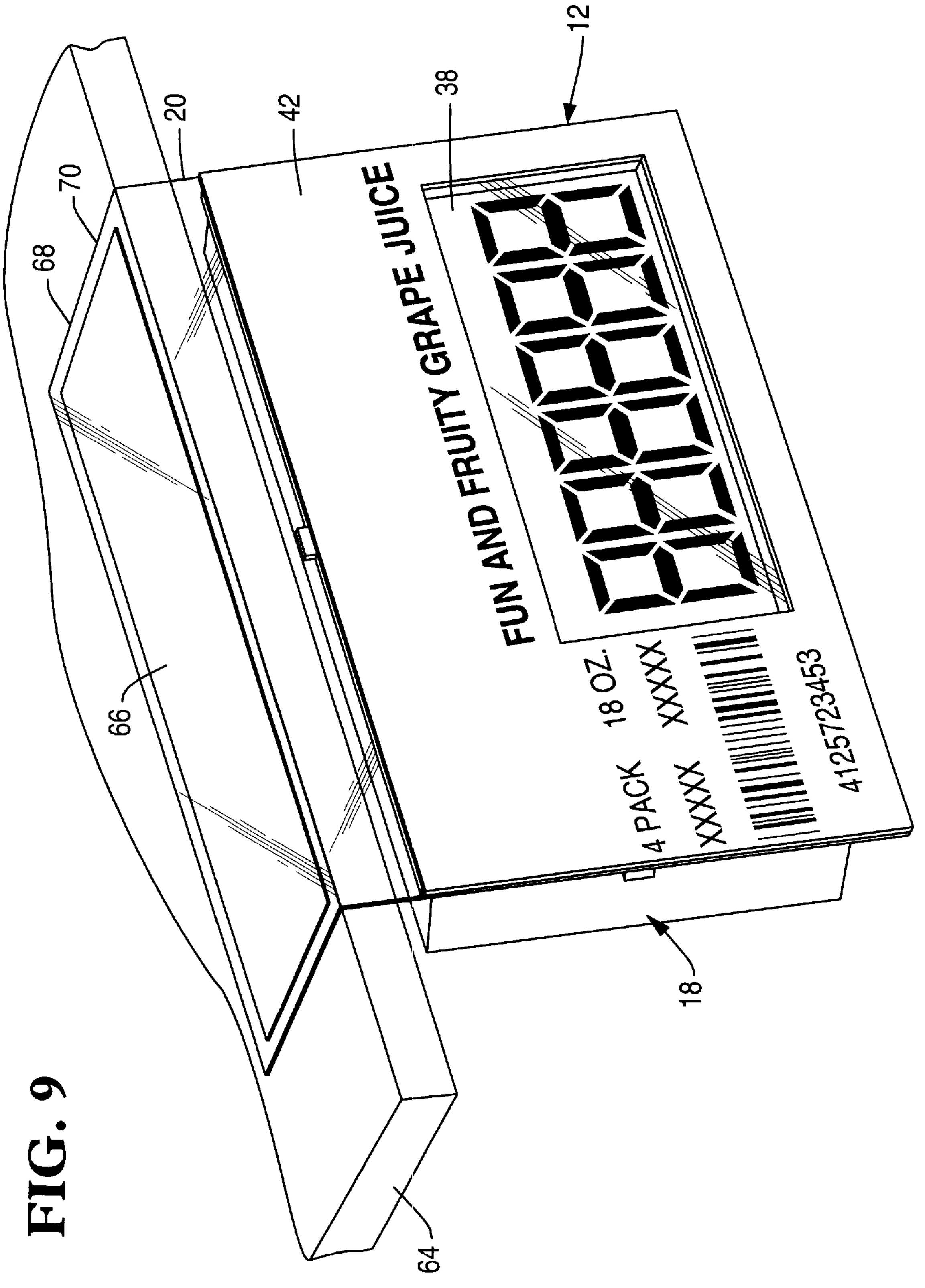
FIG. 9 is a perspective view of the EPL from FIG. 8 mounted directly to a shelf surface using an adhesive.

Turning now to FIG. 8, yet another alternative EPL sheet 10 is shown. EPL sheet 10 is manufactured in a similar fashion as the EPL sheet of FIG. 6, except that the wider distance W1 provides extra material for mounting EPL 12 directly to a shelf surface 64 (FIG. 9) using an adhesive 66. Thus, EPL 12 is suitable for mounting to shelves without channels 50, which may be found in warehouses.

Tub sheet 28 includes joining strips 24, which have two score lines 26A and 26B. Score lines 26A and 26B allow excess material 25 in joining strips 24 to be removed.

Lid sheet 30 includes score line 32. Score line 32 forms a dividing line between EPLs 12 as in FIGS. 1 and 4. Lid sheet 30 includes enough area to provide a top mounting portion 68.

The underside of portion 70 of top mounting portion 68 is preferably coated with adhesive 66. Alternatively, adhesive 66 may be applied manually during installation.

Overlay sheet 40 includes score lines 44A and 44B which allow excess overlay material 45 to be removed during installation. Vertical score lines 44 along the sides of EPLs 12 are similar to those in FIG. 1.

Figure 10:
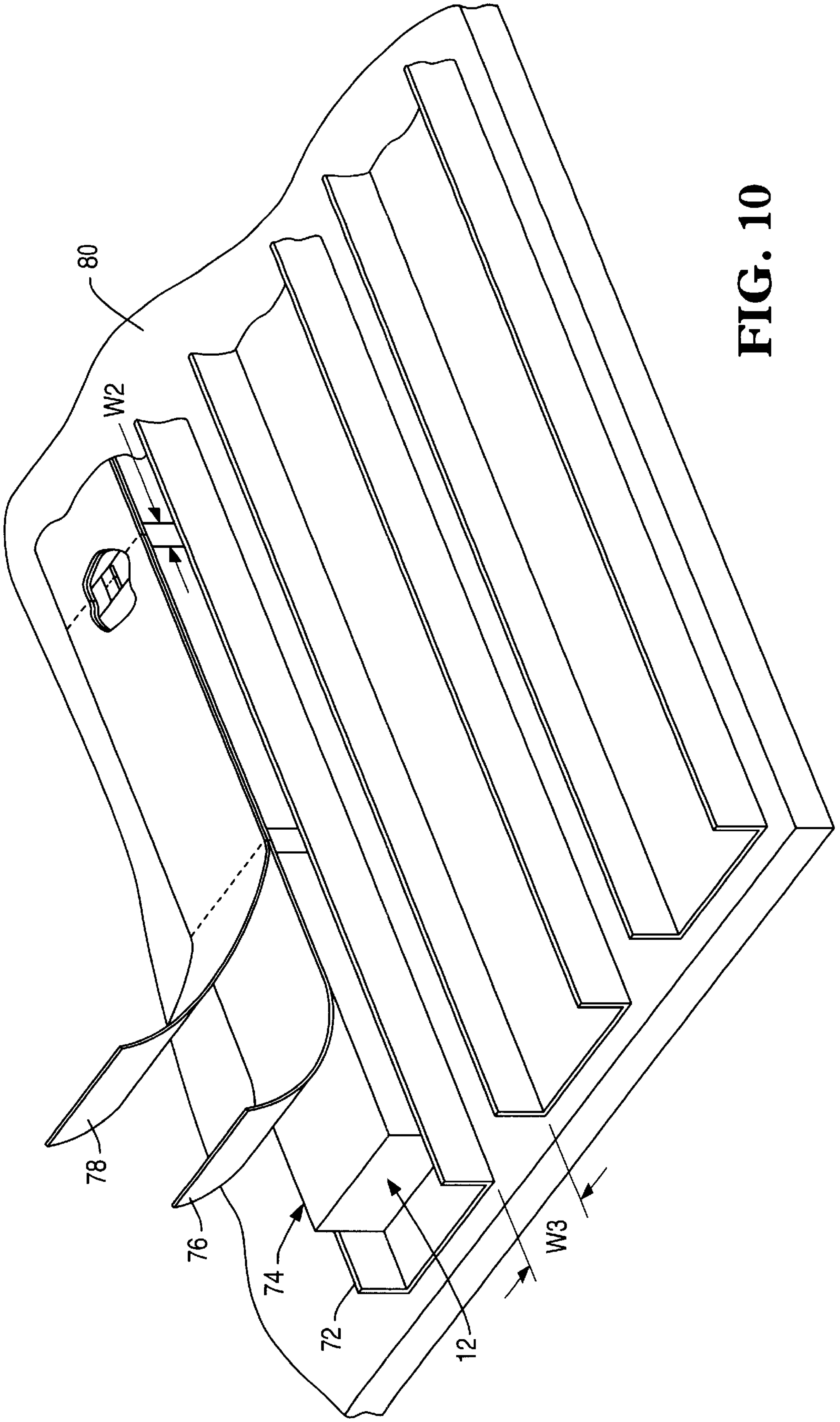
FIG. 10 shows an assembly tray.

Turning now to FIG. 10, an assembly tray 80 may optionally be employed to stabilize EPLs 12 during assembly. Use of tray 80 provides an alternative to joining strips 24. Tray 80 includes tracks or channel members 72 whose separation distance W3 may be adjusted to provide separation distance W1 in order to assemble any of the types of EPLs 12 illustrated in FIGS. 1, 4, 6, and 8.

Use of assembly tray 80 also allows separated EPLs 12 or rows EPLs 12 to be assembled. Wider channel members 72 can accommodate columns of EPLs 12. FIG. 10 illustrates tracks 72 which accommodate separate EPLs 12 or rows 74 of EPLs 12, and corresponding rows of lid and overlay sheets 76 and 78.

Since a plurality of EPLs 12 may be manufactured at the same time, the present invention reduces assembly time and cost.

Although the present invention has been described with particular reference to certain preferred embodiments thereof, variations and modifications of the present invention can be effected within the spirit and scope of the following claims.

What is claimed is:

1. A method of assembling a plurality of electronic price labels (EPLs) comprising the steps of:

providing a plurality of containers which are joined together by strips;

inserting electronic circuitry, including a display, in each container;

applying a transparent sheet containing first score lines to the containers; and applying an overlay sheet containing second score lines to the transparent sheet;

wherein the EPLs are separable along the first score lines and a number of the second score lines and the strips are removable following application of the overlay sheet.

2. A method of assembling a plurality of electronic price labels (EPLs) comprising the steps of:

providing a plurality of containers which are joined together by strips;

inserting electronic circuitry, including a display, in each container;

applying a transparent sheet containing first portions covering the containers and second portions extending between the containers for mounting the EPLs and including first score lines; and applying an overlay sheet containing second score lines to the transparent sheet;

wherein the EPLs are separable along the first score lines and a number of the second score lines and the strips are removable following application of the overlay sheet.

3. A method of assembling a plurality of electronic price labels (EPLs) comprising the steps of:

providing a plurality of containers which are joined together by strips;

inserting electronic circuitry, including a display, in each container;

applying a transparent sheet including first score lines and containing first portions covering the containers and second portions extending beyond the containers having apertures defined by second score lines for mounting the EPLs on a rod and; and applying an overlay sheet containing third score lines to the transparent sheet;

wherein the EPLs are separable along the first score lines and a number of the third score lines and the strips are removable following application of the overlay sheet.

4. A method of assembling a plurality of electronic price labels (EPLS) comprising the steps of:

providing a plurality of containers which are joined together by strips;

inserting electronic circuitry, including a display, in each container;

applying a transparent sheet including first score lines and containing first portions covering the containers and second portions extending beyond the containers for mounting the EPLs in a shelf channel; and applying an overlay sheet containing second score lines to the transparent sheet;

wherein the EPLs are separable along the first score lines and a number of the second score lines and the strips are removable following application of the overlay sheet.

5. A method of assembling a plurality of electronic price labels (EPLs) comprising the steps of:

providing a plurality of containers which are joined together by strips;

inserting electronic circuitry, including a display, in each container;

applying a transparent sheet including first score lines and containing first portions covering the containers and second portions extending beyond the containers for mounting the EPLs to a shelf surface; and applying an overlay sheet containing second score lines to the transparent sheet;

wherein the EPLs are separable along the first score lines and a number of the second score lines and the strips are removable following application of the overlay sheet.

6. A method of producing an electronic price label (EPL) comprising the steps of:

aligning a plurality of containers each having a bottom and a number of side walls and an opening;

inserting electronic circuitry, including a display, into each container through the opening;

applying a sheet of lids to the containers across the openings, wherein each lid has a transparent area for exposing the display; and separating one container with the container's electronic circuitry and corresponding lid.

7. An electronic price label (EPL) comprising:

a container including a bottom and a number of side walls and an opening and a number of removable tabs which join the container to other containers;

electronic circuitry, including a display, in the container; and a transparent lid over the opening of the container;

wherein the display is visible through the transparent lid.

8. The EPL as recited in claim 7, wherein the container comprises a plastic tub.

9. The EPL as recited in claim 7, wherein the container further comprises a number of removable tabs which join the container to other containers.

10. The EPL as recited in claim 7, further comprising an overlay sheet over the transparent lid.

11. A plurality of electronic price labels (EPLs) comprising:

a plurality of containers each having a bottom and a number of side walls and an opening, said containers being joined by tabs;

electronic circuitry, including a display, in the containers; and a cover including a plurality of lids having transparent areas over the openings of the containers which expose the displays;

wherein individual containers and the container lids are separable following application of the cover.

12. The EPL as recited in claim 11, further comprising an overlay sheet over the cover; wherein the individual containers and the lids are separable following application of the overlay sheet.

13. An electronic price label (EPL) comprising:

a container including a bottom and a number of side walls and an opening;

electronic circuitry, including a display, in the container;

a transparent lid over the opening of the container; and an overlay sheet over the transparent lid;

wherein the display is visible through the transparent lid.

* * * * *